US007983838B1

(12) United States Patent
Mislan

(10) Patent No.: US 7,983,838 B1
(45) Date of Patent: Jul. 19, 2011

(54) GUIDANCE SYSTEM THAT INFORMS THE VEHICLE OPERATOR THAT THE VEHICLE IS SAFELY IN THE CENTER OF THE CORRECT ROAD LANE, AIRSTRIP, BOAT CHANNEL OR PATH BY MEANS OF PASSIVE ELEMENTS IMBEDDED OR SUBMERGED IN SAID LANES AND THAT FUNCTIONS DAY OR NIGHT IN ALL WEATHER CONDITIONS

(75) Inventor: Joseph David Mislan, Lawrenceville, NJ (US)

(73) Assignee: Joseph D. Mislan, Lawrenceville, NJ (US)

( * ) Notice: Subject to any disclaimer, the term of this patent is extended or adjusted under 35 U.S.C. 154(b) by 269 days.

(21) Appl. No.: 12/380,046

(22) Filed: Feb. 24, 2009

Related U.S. Application Data

(60) Provisional application No. 61/194,108, filed on Jul. 30, 2008.

(51) Int. Cl.
*G01C 21/00* (2006.01)

(52) U.S. Cl. ....................................................... 701/205

(58) Field of Classification Search .................... 701/19, 701/23, 205, 211; 340/425.2, 426.13
See application file for complete search history.

(56) References Cited

U.S. PATENT DOCUMENTS 4,361,202 A * 11/1982 Minovitch .................... 180/168

* cited by examiner

*Primary Examiner* — Kim T Nguyen

(57) ABSTRACT

It is the object of this invention to provide a system that informs a vehicle operator that the vehicle is safely in the center of the proper lane of intended travel. It further informs the operator of specifics about the lane. Presence of the vehicle in an incorrect lane or going in the wrong way sets off an audible alarm. The information is visible on a computer screen in full view of the operator. It is functional regardless of the time, day or night, weather conditions, visibility or electrical interference. A metal detector senses passive elements imbedded in the center of the lane. For a boat the element is submerged in the proper channel and is sensed by a sonar device. Imbedded bar codes are the sources of the information. The general configuration is shown in FIGS. 1*a*-1*c*. FIGS. 2-4 show simplified block diagrams for the system.

19 Claims, 6 Drawing Sheets

Figure 1A:
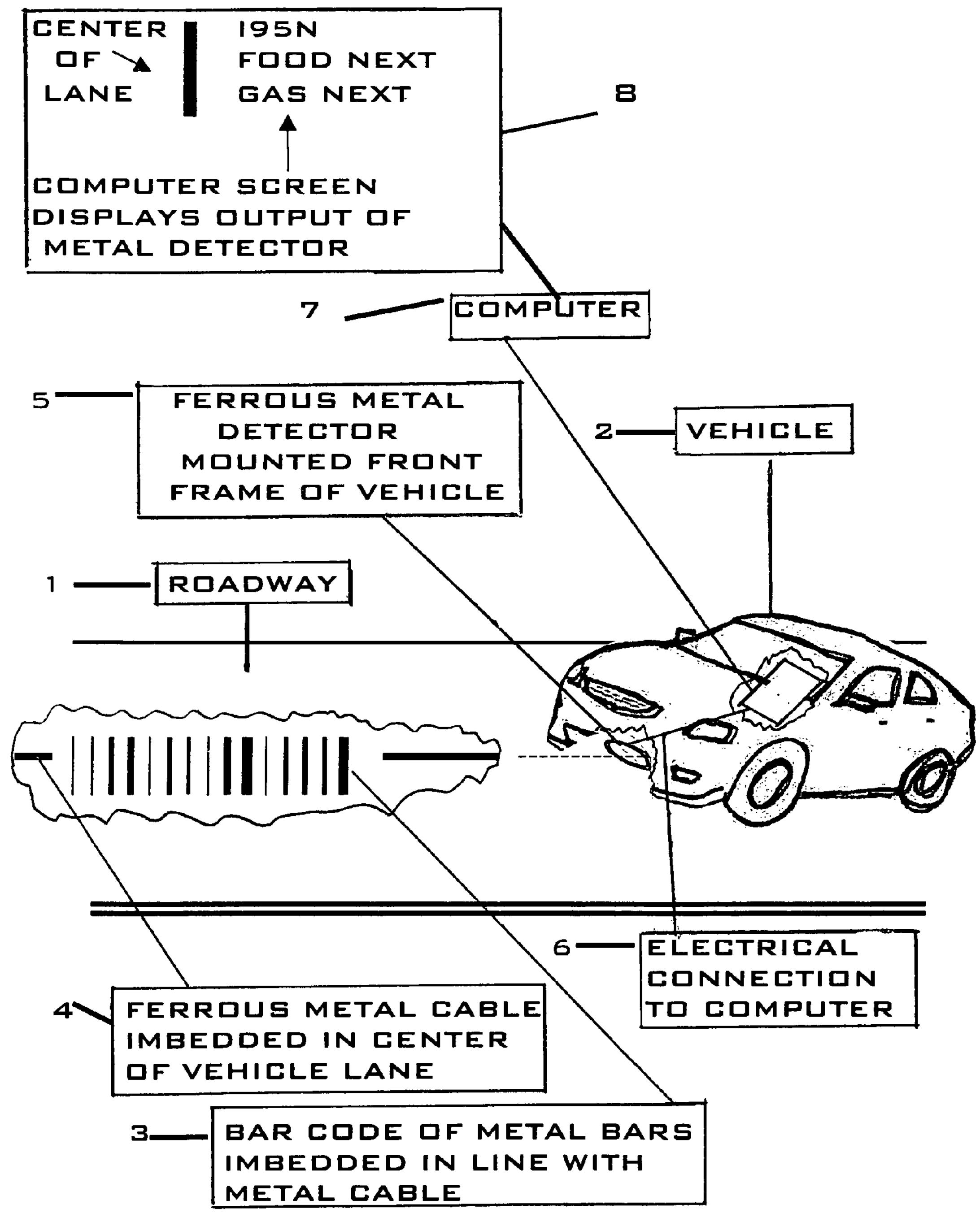

CENTER OF LANE
I95N
FOOD NEXT
GAS NEXT
COMPUTER SCREEN DISPLAYS OUTPUT OF METAL DETECTOR
8
7 COMPUTER
5 FERROUS METAL DETECTOR MOUNTED FRONT FRAME OF VEHICLE
2 VEHICLE
1 ROADWAY
6 ELECTRICAL CONNECTION TO COMPUTER
4 FERROUS METAL CABLE IMBEDDED IN CENTER OF VEHICLE LANE
3 BAR CODE OF METAL BARS IMBEDDED IN LINE WITH METAL CABLE

Components of Day/Night All Weather Operator Guidance System Using Conventional 2-Coil Metal Detector.

Guidnace Sytem for Boats.

GUIDANCE SYSTEM THAT INFORMS THE VEHICLE OPERATOR THAT THE VEHICLE IS SAFELY IN THE CENTER OF THE CORRECT ROAD LANE, AIRSTRIP, BOAT CHANNEL OR PATH BY MEANS OF PASSIVE ELEMENTS IMBEDDED OR SUBMERGED IN SAID LANES AND THAT FUNCTIONS DAY OR NIGHT IN ALL WEATHER CONDITIONS

CROSS REFERENCE TO RELATED APPLICATIONS

Filing Date: Jul. 30, 2008.

Provisional patent application: Application No. 61/194,108.

Applicant: Joseph D. Mislan

FEDERALLY SPONSORED RESEARCH

NOT APPLICABLE.

SEQUENCE LISTING OR PROGRAM

NOT APPLICABLE.

BACKGROUND OF THE INVENTION

In prior art the operator of a vehicle had to be able to see outside the vehicle for posted signs, painted lanes on the surface of a road or airstrip or be able to sight buoys floating in water, or on radio signals to receive information, or laser beams to locate position. This invention is self-contained within the vehicle and is independent of outside interference.

PRIOR ART AND SEARCH RESULTS

U.S. Pat. No. 7,277,392 Vehicle guidance software, method and system
U.S. Pat. No. 7,263,422 Method and system for controlling a mobile machine
U.S. Pat. No. 6,971,464 Driverless vehicle guidance system and method
U.S. Pat. No. 6,910,657 System and method for locating a target and guiding a vehicle toward the target
U.S. Pat. No. 6,643,576 Rapid adjustment of trajectories for land vehicles
U.S. Pat. No. 6,480,783 Real time vehicle guidance and forecasting system under traffic jam conditions
U.S. Pat. No. 6,388,565 Guidance system for assisting lane change of a motor vehicle
U.S. Pat. No. 6,377,889 Non-linear method of guiding to arbitrary curves with adaptive feedback
U.S. Pat. No. 6,314,368 Vehicle guidance system and method therefore
U.S. Pat. No. 6,275,182 Radome polarization error compensation
U.S. Pat. No. 6,163,745 Guidance system for automated vehicles, and guidance strip for use therewith
U.S. Pat. No. 5,875,408 Automated vehicle guidance system and method for automatically guiding a vehicle
U.S. Pat. No. 5,784,156 Fiber optic guidance system for laser guided missiles
U.S. Pat. No. 5,504,683 Traffic management system
U.S. Pat. No. 5,428,545 Vehicle guiding system responsive to estimated congestion
U.S. Pat. No. 5,302,835 Light detection system having a polarization plane rotating means and a polarizing be
U.S. Pat. No. 5,297,049 Vehicle guidance system
U.S. Pat. No. 5,247,439 Vehicle guidance system
U.S. Pat. No. 5,155,683 Vehicle remote guidance with path control
U.S. Pat. No. 5,136,225 Device for guiding vehicles on a virtual track
U.S. Pat. No. 5,126,941 Vehicle guidance system
U.S. Pat. No. 5,085,149 Ground vehicle suspension and guidance and electromagnetic system thereof with mu
U.S. Pat. No. 5,060,575 Turn controller for suspended personal transport vehicle
U.S. Pat. No. 4,979,113 Automated vehicle control
U.S. Pat. No. 4,864,207 Unmanned vehicle guidance system
U.S. Pat. No. 4,734,683 Electronic row width monitor
U.S. Pat. No. 4,703,820 Vehicle guidance means
U.S. Pat. No. 4,656,406 Electric field guidance system for automated vehicles
U.S. Pat. No. 4,307,329 Wire guidance method and apparatus
U.S. Pat. No. 4,160,488 Extended width sensor
U.S. Pat. No. 4,142,695 Vehicle guidance system
U.S. Pat. No. 4,083,310 Vehicle guidance system incorporating track
U.S. Pat. No. 4,083,047 Vehicle guidance system
U.S. Pat. No. 4,079,801 Vehicle guidance systems
U.S. Pat. No. 4,041,876 Vehicle guiding system
U.S. Pat. No. 4,040,004 Color coded vehicle guidance system
U.S. Pat. No. 3,984,068 Vehicle guidance system using angular rate of change

ABSTRACT/SUMMARY

Figure 2:
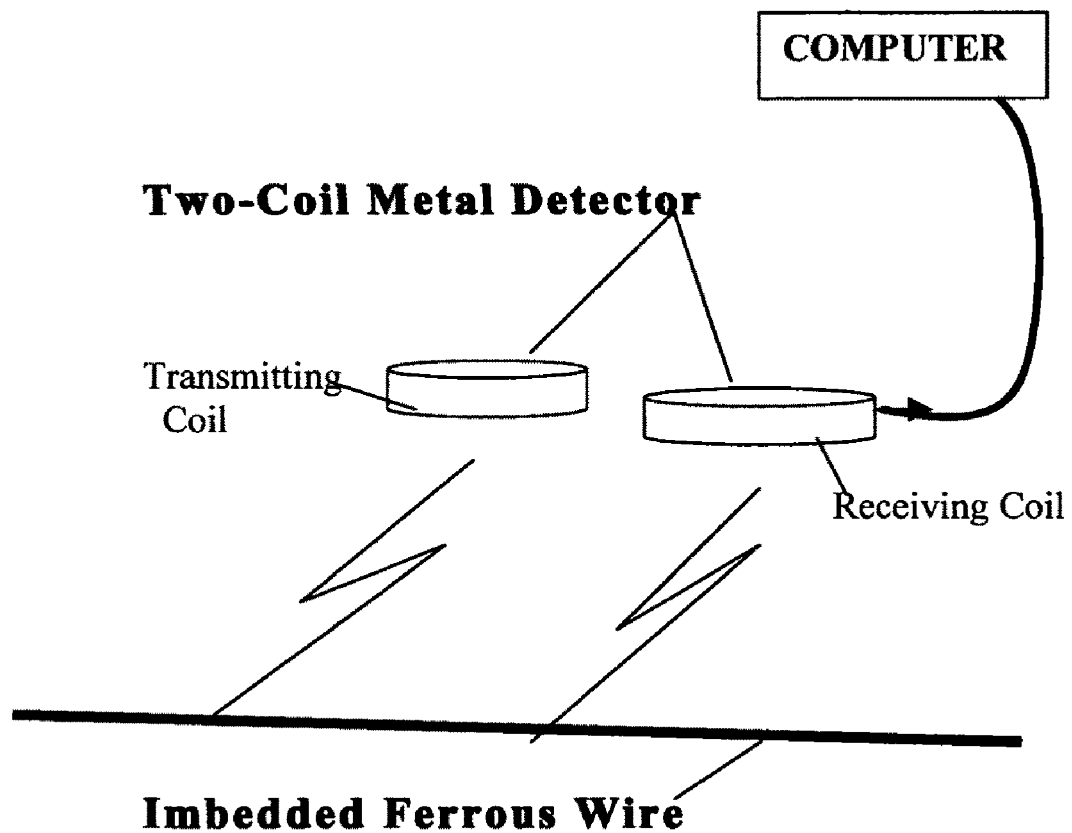
Figure 3:
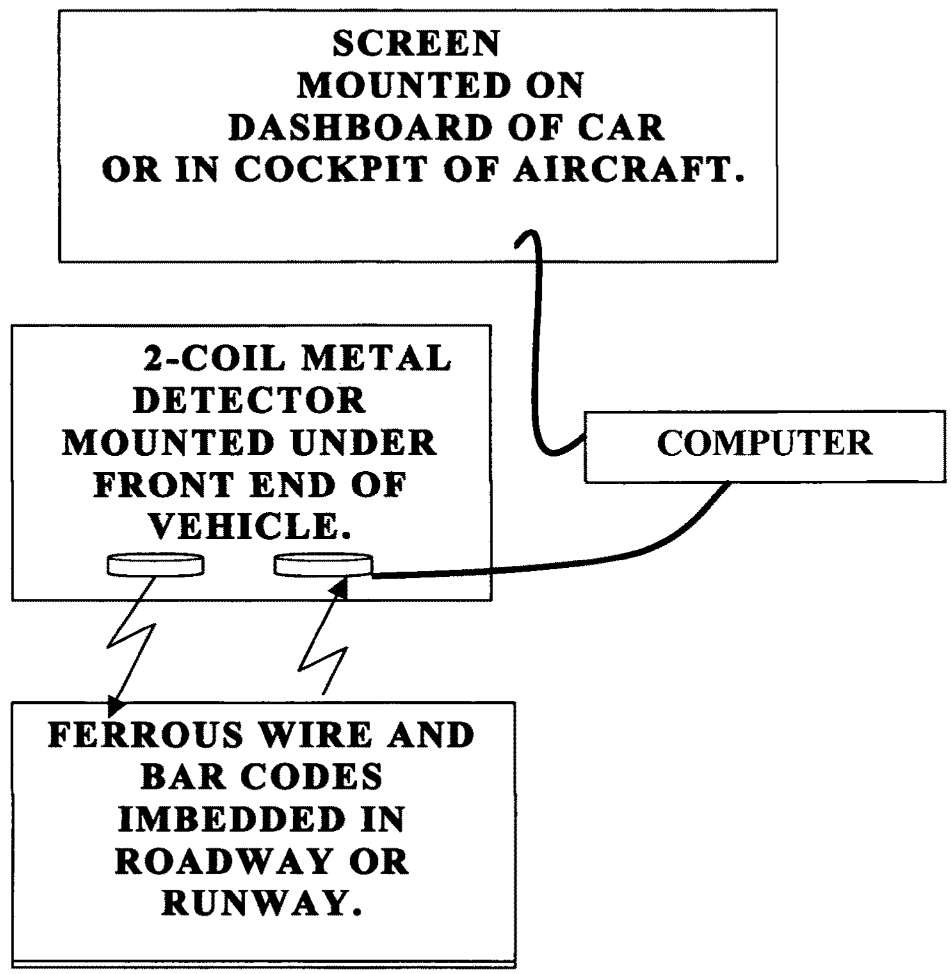
Figure 4:
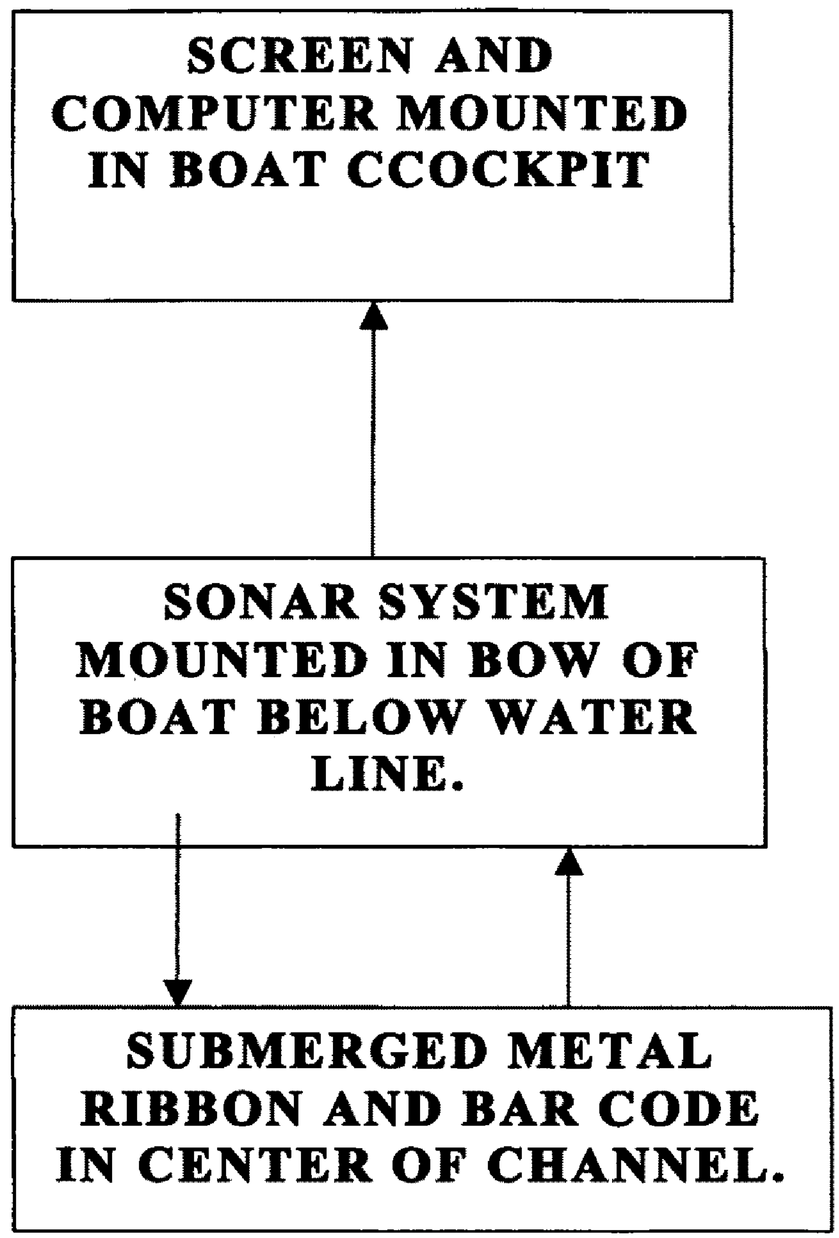

It is the object of this invention to provide a system that informs a vehicle operator that the vehicle is safely in the center of the lane on a roadway for an automobile, the center of an airstrip or landing strip for an aircraft, or the center of a water channel for a boat. It further informs the operator of a car of the route number, the pilot of an airplane of the airstrip identification, or the pilot of a boat of channel name, latitude and longitude, the vehicle speed, and compass direction. Presence of the vehicle in an incorrect location, lane or going the wrong way sets off an audible alarm. Provision is also made to include approaching intersections, and crossroads, changes to alternate routes, and on roadways approaching commercial establishments. The information is visible on a computer screen in full view of the operator and is functional regardless of the time, day or night, weather conditions, visibility or electrical interference. A metal detector, magnetometer, senses passive elements, such as a ferrous wire but not limited to that cross section or material, imbedded in the center of the lane or airstrip or submerged metal ribbon but not limited to that material and cross section, for a boat. In the case of a boat, a sonar device senses the passive element, submerged in the water in the center of the channel. Coded (bar code) information in passive elements imbedded in the road alert the operator of approaching intersections and approaching commercial establishments. A metal detector, magnetometer detects the imbedded passive elements. The general configuration is shown in FIG. 1*a* for a car, FIG. 1*b* for a boat and FIG. 1*c* for an aircraft. FIG. 2 shows a simplified diagram for a metal detector. FIG. 3 shows a simplified block diagram for a car or aircraft. FIG. 4 shows a simplified block diagram for a boat. The system is independent of outside conditions and is functional, day and night.

ADVANTAGES

This invention has to do with improvements that inform a vehicle operator that he is driving his vehicle safely in the center of his lane of the roadway on which he is traveling. It further informs the operator by means of bar codes of the route number, the vehicle speed, compass direction, correct lane and alarm for incorrect (wrong way) lane. Provision is also made for cars to include approaching information for intersections, crossroads, changes to alternate routes, and approaching commercial establishments.

It is recognized that existing systems for guidance, that include lighted road signs, painted surface road lane markings, and inventions that include Global Positioning Systems (GPS) as U.S. Pat. No. 7,460,987 "GPS, Satellite Simulation System" and other inventions as U.S. Pat. No. 7,277,792 "Vehicle guidance software, method and system", provide such information. The present invention is characterized by differences where RF interference and poor visibility are not factors in the operation of the system. It is an on-board system that is characterized by differences both as to detail and as to operating principles and features, which in combination provide extensive and important advantages. These latter will best be understood from the following specific objects of the invention, which are so drawn as to provide a comparison with generally analogous prior art systems so as to avoid a tedious repetition of the history of such prior art.

OBJECT OF INVENTION

It is the principle object of the invention to provide an improved system and equipment of this general type of vehicle guidance systems that make fullest use of modern technology by electronic means which will provide reliable results and auxiliary features useful therewith, at a relatively low cost considering the results achieved.

It is accordingly one specific object of the invention to provide a system that is independent of weather conditions as fog, rain, snow or RF interference and is functional, day and night.

A further specific object of the invention is to provide safe driving by continuously alerting the vehicle operator that he is safely in the center of said lane. Accordingly, the operator is informed that the vehicle is in the center of the lane; it is in the correct lane and going in the right direction. An audible alarm is turned on when the vehicle veers from the intended centre line of the lane and the alarm continues until the vehicle is steered back to the center. The alarm is also sounded if the vehicle is going in the wrong direction.

Still another object of the invention is to name the road for corporate establishments for a fee collected by State and Federal agencies. The road name would be displayed on the screen along with the centerline of the road. The names are bar coded with passive elements imbedded in the roadway.

Still another object of the invention is to include names of approaching cities and commercial establishments as on road signs by means of bar codes imbedded in the roadway.

Still another object of the invention is to pre-select the route and destination from the keyboard of the computer that will match bar codes imbedded in the roadway as the vehicle progresses on the route.

A further object related to the previous paragraphs is to provide the pilot of an aircraft with information that the aircraft is in the center of the landing and takeoff airstrips and on the correct airstrip. A metal detector mounted on the aircraft reads the information from passive elements and bar codes imbedded in airstrip. Such information is displayed in the cockpit in full view for the pilot.

A further object of the invention related to the previous paragraphs is to guide the pilot of the boat to keep in the center of the correct channel. The information is read from submerged metal ribbons, but not limited in cross section or material, and bar codes by means of a sonar device mounted in the boat. The information is displayed on a computer screen mounted in the cabin in full view for the pilot allowing him to avoid collisions and avoid running into shallow water, regardless of weather conditions.

A further object of the invention related to the previous paragraphs is in a military operation where a path had been cleared through a mine field and marked by imbedding a metal wire, a vehicle could safely be guided on the path through the mine field.

A further object of the invention related to the previous paragraphs is in a naval operation where a channel had been cleared of mines and marked by the submerged sound reflecting ribbon, a vessel could be safely guided through the channel without danger of detonating a mine.

A further object of the invention related to the previous paragraphs, for the seeing impaired, a miniature metal detector is constructed into the left and right soles of a pair of shoes which sense metal wires inserted in a rug, in the floor, or outdoors in the pavement, the electrical signal of said detector is converted into an audible signal verifying the correct path.

A further object of the invention related to the previous paragraphs is for the seeing impaired, a walking cane with a miniature metal detector constructed near the end of the cane, that senses the aforementioned wires, the said signal is converted into an audible signal verifying the correct path.

A further object of the invention related to the previous paragraphs is for the seeing impaired to be informed of the street names or numbers at a intersection as read by aforementioned detectors from bar codes imbedded in the pavement at the intersection.

In brief, the invention provides guidance for operators to safely position the vehicle a). In the center of the car lane, the airstrip or the channel being traveled, b). In the correct lane, on the correct airstrip or in the correct channel, c). In the proper direction d). With further information for cars about approaching intersections and commercial establishments.

A complete embodiment of preferred forms of the invention will be described below by way of example and illustration, so as to enable those skilled in the art to practice the invention, but without intention to limit the full scope of the same as defined in the claims appearing at the end of this specification.

Applicant: Joseph D. Mislan Customer #000080125 Issued May 30, 2008

Provisional Patent Application No. 61/194,108 Filing date Jul. 30, 2008.

DRAWINGS

FIG. 1*a* Configuration showing elements of the System for a Car.

Figure 1B:
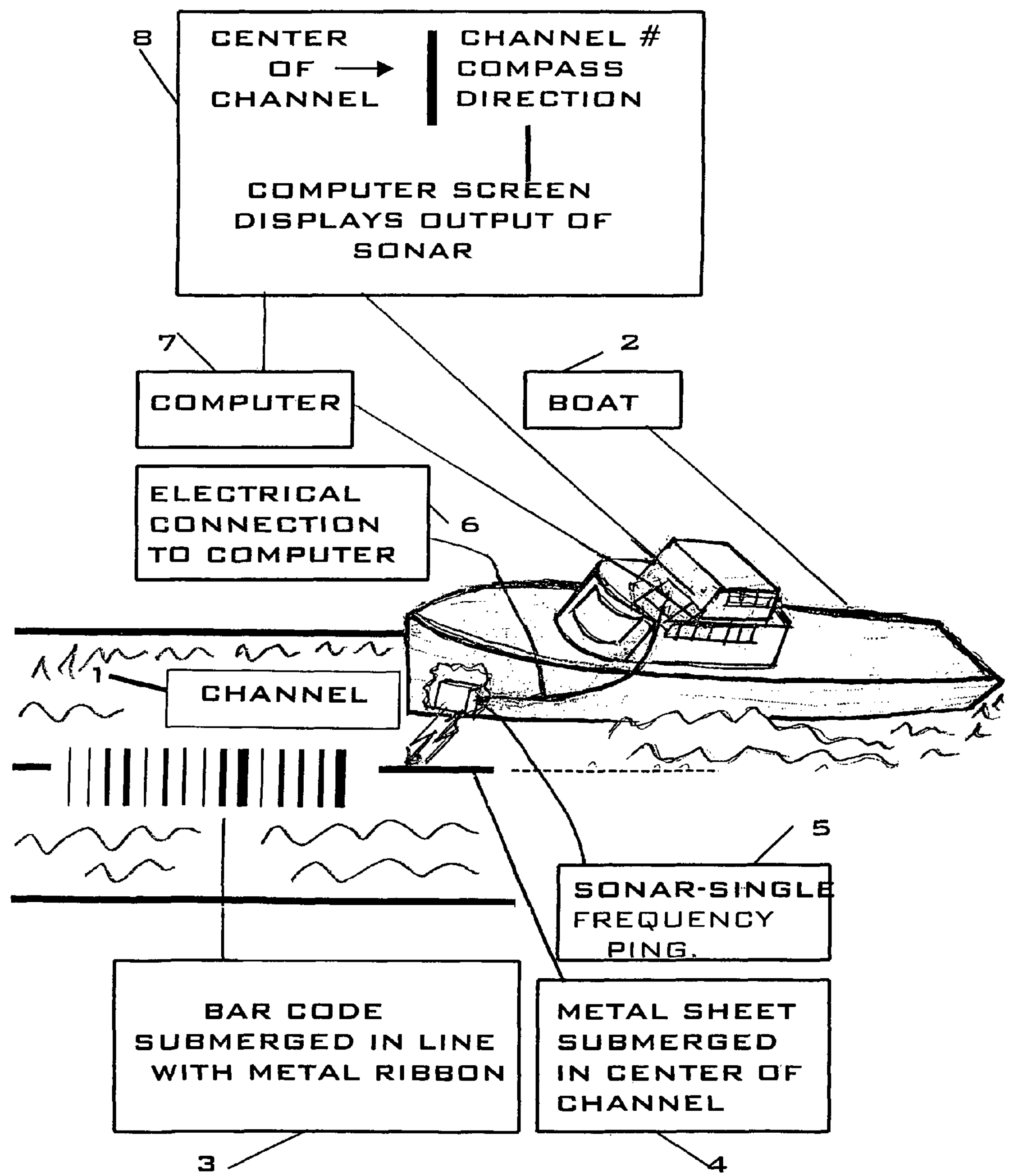

FIG. 1*b* Configuration showing elements of the System for a Boat installation.

Figure 1C:
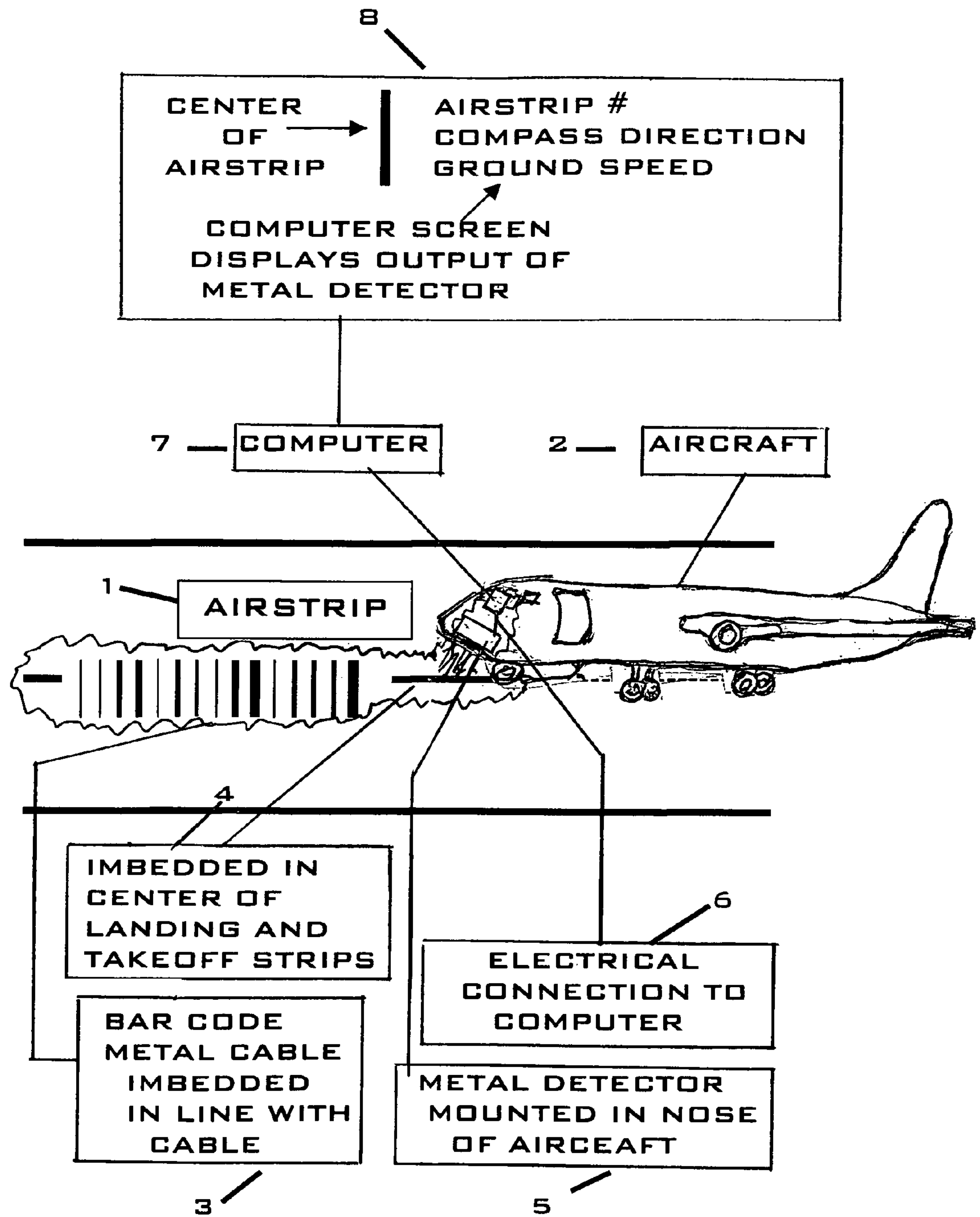

FIG. 1*c* Configuration showing elements of the System for an Airplane installation.

FIG. 2 Simplified Block Diagram for metal detector.

FIG. 3 Simplified Block Diagram of Guidance System Car and Aircraft.

FIG. 4. Simplified Block Diagram for a Boat.

GENERAL/DETAILED

Preferred Embodiment

Referring first to FIG. 1*a* of the drawings, the basic system for an automobile is shown by illustration and annotation. Imbedded in the lane of the roadway 1 are bar codes 3 and a cable 4. Mounted on the vehicle 2 is a 2-coil ferrous metal detector 5. The signal output of the detector is electrically connected 6 to the computer 7 which converts the signal for display on the computer screen 8 in full view of the operator. The annotations in 8 show in full view the information that the operator will see. Accordingly the operator can guide the vehicle safely in the middle of the lane being traveled.

Referring to FIG. 1*b*, in the center of the channel 1 are submerged the bar codes 3 and ribbon of metal 4. The ribbon of metal provides a broader surface to reflect the Sonar wave and would be a more reliable reflector of the said Sonar wave than a wire. Mounted in the boat 2 is a single frequency Sonar device 5. The Sonar's electrical output is carried by wire 6 to the computer 7. The signals are converted and displayed on the computer screen 8 in full view of the pilot, who accordingly can maintain the proper route in the channel.

Referring to FIG. 1*c*, the bar code 3 and cable 4 are imbedded in the airstrip 1. The metal detector 5 and the computer 7 are installed in the aircraft 2. The electrical output signal of the detector is carried by wire 6 to the computer 7 where it is converted for display on the computer screen 8 in full view of the pilot who accordingly can land or takeoff safely on the proper airstrip.

Referring to FIG. 2, the simplified diagram of a 2-coil metal detector is shown. The transmitting coil induces a current in the cable that in turn develops a magnetic field around the wire. The magnetometer, receiving coil detects the field.

Referring to FIG. 3, the system is shown in a simplified block diagram for a car or aircraft. Referring to FIG. 4, the system is shown in a simplified block diagram for a boat.

PRE-PROGRAMMING

Additional Embodiment

Car routes by number and name, commercial establishments and destination can be pre-programmed and stored in the computer memory. As the vehicle progresses on the route, the pre-programmed data is matched with the detected data, insuring that the correct route is being taken.

For aircraft, the location for lining-up prior to takeoff and the takeoff airstrip can be pre-programmed, insuring that the aircraft is in the designated location and taking off from the designated airstrip. On occasion there have been errors in aircraft location and takeoff that the tower was not able to discern and correct. The system would provide a backup for the pilot to insure a safe location and proper airstrip for takeoff.

For boats, channel name, successive locations on the route designated by latitude and longitude and compass direction can be pre-programmed and stored in the computer memory. Collisions and running aground will be avoided as the boat progresses on its route and the pre-programmed data is matched with the detected data.

The invention claimed is:

1. A vehicular guidance system for providing an operator of a vehicle with guidance information for traveling along a path of travel that is impervious to localized radio frequency disruption and usable under limited visibility conditions for safety comprising:

A. a metal detecting means mounted within a vehicle for sensing any metallic members within the path of travel of the vehicle;

B. a passive guidance element being metallic and positioned along the path of travel of the vehicle which is adapted to be sensed by said metal detecting means for communicating guidance information thereto to facilitate the operator in accurately controlling of movement of the vehicle along the path of travel; and C. a control means positioned within the vehicle for communicating the guidance information to the vehicle operator, wherein said passive guidance element includes metal bar code elements containing information identifying the correct direction of movement along the path of travel.

2. A vehicular guidance system for providing an operator of a vehicle with guidance information for enhanced safety as defined in claim 1 wherein said metal detecting means comprises:

A. a signal transmitting coil means mounted within the vehicle for generating a magnetic field signal to be received by said passive guidance element for inducing electrical current flow therewithin; and B. a signal sensing coil means mounted within the vehicle for sensing the electrical current flow induced within said passive guidance element by the magnetic field generated by said signal transmitting coil means.

3. A vehicular guidance system for providing an operator of a vehicle with guidance information for enhanced safety as defined in claim 1 wherein said passive guidance element is positioned extending generally centrally along the path of travel.

4. A vehicular guidance system for providing an operator of a vehicle with guidance information for enhanced safety as defined in claim 2 wherein said signal sensing coil means comprises a magnetometer.

5. A vehicular guidance system for providing an operator of a vehicle with guidance information for enhanced safety as defined in claim 1 wherein said control means includes a computer means and a display means for processing and communicating guidance information for use by the vehicle operator.

6. A vehicular guidance system for providing an operator of a vehicle with guidance information for enhanced safety as defined in claim 1 wherein said metal detecting means comprises a metal detector device mounted directly to the vehicle therebeneath.

7. A vehicular guidance system for providing an operator of a vehicle with guidance information for enhanced safety as defined in claim 1 wherein said passive guidance element includes a ferrous metal cable.

8. A vehicular guidance system for providing an operator of a vehicle with guidance information for enhanced safety as defined in claim 1 wherein said passive guidance element includes metal bar code elements containing the guidance information specifically relative to the local path of travel.

9. A vehicular guidance system for providing an operator of a vehicle with guidance information for enhanced safety as defined in claim 8 wherein the guidance information contained within said metal bar code elements includes the position of intersections in the path of travel and conventional highway signage information.

10. A vehicular guidance system for providing an operator of a vehicle with guidance information for enhanced safety as defined in claim 1 wherein the vehicle is a land vehicle and said passive guidance element is embedding centrally within the path of travel comprising a conventional vehicle roadway.

11. A vehicular guidance system for providing an operator of a vehicle with guidance information for enhanced safety as defined in claim 1 wherein the vehicle is an aircraft and said passive guidance element is positioned within an airport runway.

12. A vehicular guidance system for providing an operator of a vehicle with guidance information for enhanced safety as defined in claim 1 wherein the vehicle is a watercraft and said passive guidance element is positioned submerged below water level within the path of travel which comprises a navigable waterway.

13. A vehicular guidance system for providing an operator of a vehicle with guidance information for enhanced safety as defined in claim 12 wherein said metal detecting means is operable to generate a single frequency sonar wave signal and is also operable to sense the single frequency sonar wave signal.

14. A vehicular guidance system for providing an operator of a vehicle with guidance information for enhanced safety as defined in claim 1 wherein said control means is operable to generate an alarm signal responsive to sensing of an emergency condition by said metal detecting means.

15. A vehicular guidance system for providing an operator of a vehicle with guidance information for enhanced safety as defined in claim 1 wherein said control means is adapted to be capable of being preprogrammed with the guidance information specifically related to the path of travel to facilitate the operator of the vehicle in guiding movement thereof.

16. A vehicular guidance system for providing an operator of a vehicle with guidance information for enhanced safety as defined in claim 1 wherein the vehicle is a land vehicle and wherein the path of travel is a roadway and wherein said control means is capable of being preprogrammed with guidance information to facilitate the operator of the land vehicle in guiding movement thereof wherein the guidance information includes identifying information related to the roadway, local roadway intersections and conventional roadway signage information.

17. A vehicular guidance system for providing an operator of a vehicle with guidance information for enhanced safety as defined in claim 1 wherein said passive guidance element includes a ferrous metallic ribbon member.

18. A guidance system for providing an user with guidance information for traveling along a path of travel that is impervious to localized radio frequency disruption and usable under limited visibility conditions for safety comprising:

A. a metal detecting means retainable by the user for sensing any metallic members within a path of travel;

B. a passive guidance element being metallic and positioned along the path of travel of the user which is adapted to be sensed by said metal detecting means for communicating guidance information thereto to facilitate the user in accurately moving along the path of travel; and C. a control means attachable to the user for communicating the guidance information to the user, wherein said passive guidance element includes metal bar code elements containing information identifying the correct direction of movement along the path of travel.

19. A guidance system for providing an user with guidance information for enhanced safety for traveling along a path of travel as defined in claim 18 wherein said metal detecting means and said control means are detachably and selectively securable with respect to the user.

* * * * *